(12) United States Patent
Farley et al.

(10) Patent No.: US 10,831,568 B1
(45) Date of Patent: Nov. 10, 2020

(54) ELECTRONIC ALARM MANAGEMENT SYSTEM

(71) Applicant: INTERNATIONAL BUSINESS MACHINES CORPORATION, Armonk, NY (US)

(72) Inventors: Eliza Farley, Arlington, VT (US); Maureen Kraft, Hudson, MA (US); Alexander Rice, Cambridge, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/439,976

(22) Filed: Jun. 13, 2019

(51) Int. Cl.
*G06F 9/54* (2006.01)
*G06F 8/65* (2018.01)

(52) U.S. Cl.
CPC ............... *G06F 9/542* (2013.01); *G06F 8/65* (2013.01)

(58) Field of Classification Search
None
See application file for complete search history.

(56) References Cited

U.S. PATENT DOCUMENTS

| | | |
|---|---|---|
| 7,385,875 B2 | 6/2008 | May et al. |
| 9,454,207 B2 | 9/2016 | Tabone et al. |
| 9,693,311 B2 | 6/2017 | Cardozo et al. |
| 9,874,933 B1* | 1/2018 | Carryer ................ G06F 3/013 |
| 2009/0187780 A1* | 7/2009 | Keohane ............... G06F 1/3203 713/324 |
| 2013/0332918 A1* | 12/2013 | Aoyagi ..................... G06F 8/65 717/172 |
| 2014/0203944 A1* | 7/2014 | Lombardi ............ G08B 21/182 340/636.1 |
| 2015/0169696 A1* | 6/2015 | Krishnappa ......... G06F 3/04842 707/722 |
| 2015/0235004 A1 | 8/2015 | Shor et al. |
| 2016/0034284 A1* | 2/2016 | Won .................... G06F 9/44505 713/100 |
| 2016/0321616 A1* | 11/2016 | Gedge .................... G06Q 50/10 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Charles E Anya
(74) *Attorney, Agent, or Firm* — Ewa M. Wozniak

(57) ABSTRACT

A method, computer system, and computer program product for an electronic alarm management system. The method may include detecting a trigger event that causes a user device to be shut down. The method may include determining whether there is an event for a user of the user device that is scheduled to occur within a first time period closely following a time of the trigger event. In response to determining that there is an event occurring within the time period closely following the time of the trigger event, the method may include determining whether the event is associated with an importance score that exceeds a threshold. The event that has the importance score exceeding the threshold is deemed a critical event. The method may include generating and displaying a notification on the user device reminding the user of the critical event.

18 Claims, 5 Drawing Sheets

(56) References Cited

U.S. PATENT DOCUMENTS

| | | | |
|---|---|---|---|
| 2017/0053517 A1* | 2/2017 | Tan | G08B 21/24 |
| 2017/0207646 A1* | 7/2017 | Boss | H02J 7/0047 |
| 2018/0077097 A1* | 3/2018 | Alfaro | H04L 67/306 |
| 2018/0224915 A1* | 8/2018 | Shuster | H04M 1/72563 |
| 2018/0227411 A1 | 8/2018 | Wang et al. | |
| 2019/0305383 A1* | 10/2019 | Muntes | G01R 31/382 |

OTHER PUBLICATIONS

Stackexchange, "How can I prevent myself from powering down my phone while "Alarmy (Sleep If U Can)" is tying to wake me up?", printed on Apr. 10, 2019, p. 1, https://android.stackexchange.com/questions/93535/how-can-i-prevent-myself-from-powering-down-my-phone-while-alarmy-sleep-if-u-c.

Reddit, "Alarm app that prevents you from turning the phone off?", printed on Apr. 10, 2019, 3 pages, https://www.reddit.com/r/GetOutOfBed/comments/2tp4qd/alarm_app_th/.

* cited by examiner

ELECTRONIC ALARM MANAGEMENT SYSTEM

BACKGROUND

Embodiments of the present invention relate generally to a method, system and computer program for using an electronic alarm management program to notify a user of an upcoming event.

User may often set up alarms on the user's device to remind the user of important times or events the user may otherwise forget. For example, the user may need to take medications at a certain time during the day and may want to set an alarm to remind the user of the appropriate time.

BRIEF SUMMARY

An embodiment of the present invention may include a method, computer system, and computer program product for an electronic alarm management system. The method may include detecting a trigger event that causes a user device to be shut down. The method may include determining whether there is an event for the user of the user device that is scheduled to occur within a first time period closely following a time of the trigger event. The trigger event may be one of the user initiating a shutdown action on the user device, the user device having a low battery, or the user device is attempting to perform a software update. In response to determining that there is an event occurring within the time period closely following the time of the trigger event, the method may include determining whether the event is associated with an importance score that exceeds a threshold. The event that has the importance score exceeding the threshold may be deemed a critical event. The method may include generating and displaying a notification on the user device reminding the user of the critical event. The method may also include prompting the user to provide a first input causing the user device to remain in an on state until a time of the critical event. The method may determine whether there is an event for the user that is scheduled to occur with the first time period by scanning and parsing a calendar of the user, an alarm file of a software application running on the user device, a calling history, or a messaging history of the user.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
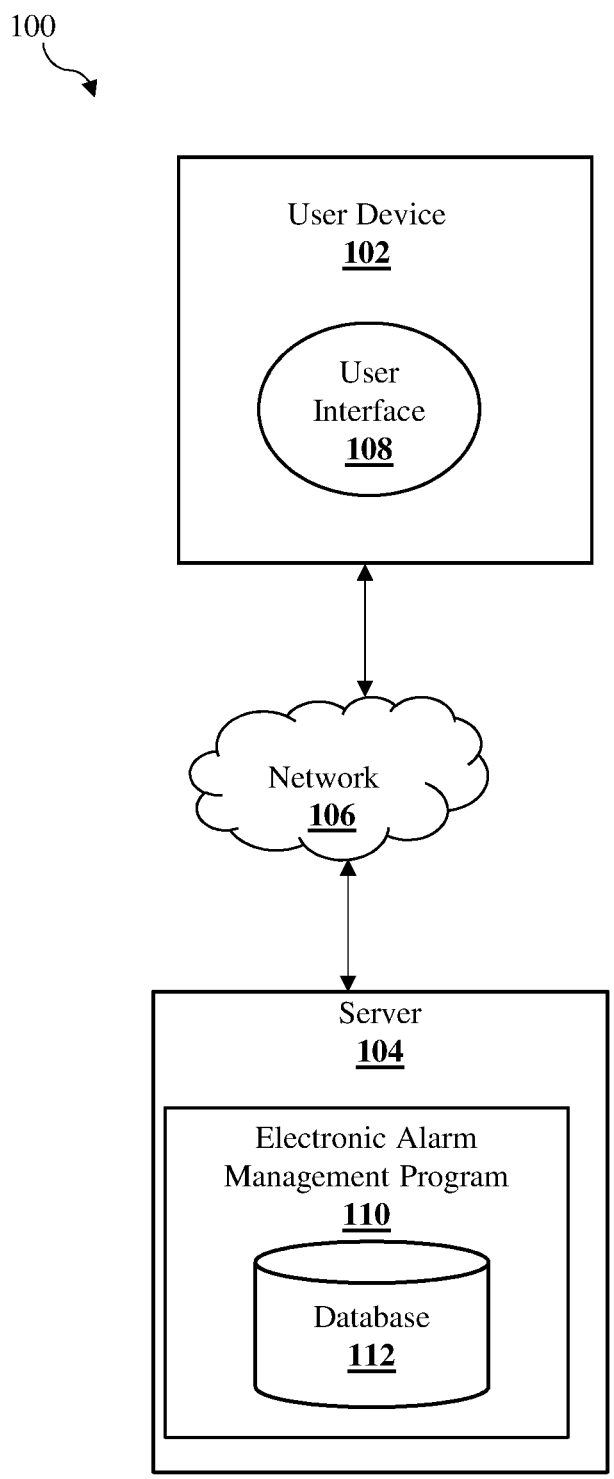
FIG. 1 is a schematic block diagram illustrating a system for using an electronic alarm management program to notify a user of an upcoming event, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for using an electronic alarm management program to notify a user of an upcoming event. Users often set up alarms on their devices, such as mobile phones, to remind them of important times or events they may otherwise forget. For example, a user may need to take medications at a certain time during the day and may want to set an alarm to remind him/her of the appropriate time. Another user may have an important meeting scheduled and may have a reminder notification set up so that the user does not forget about the meeting. Each user, in the above examples, may use a user device to set up notifications on their respective calendars. However, each user may forget about the scheduled event and turn off his/her device before the start of the event. In such a case, even though the alarm notification is set, each user will not get the reminder, or the alarm will not sound, because the device is turned off. As such, there exists a need to notify the user of an upcoming scheduled event during circumstances, such as, for example, when the user is in the process of shutting off his/her device, so that the user is able to receive the scheduled event information.

Accordingly, at least some of the embodiments described herein provide a technical solution to the problems described above with respect to notifying the user of an upcoming event before the user shuts off his/her device. Specifically, some embodiments described herein provide an electronic alarm management program that may be used to ensure that the user does not miss any important events, such as attending a scheduled meeting, or taking medication at the correct time.

Reference will now be made in detail to the embodiments of the present invention, examples of which are illustrated in the accompanying drawings, wherein like reference numerals refer to like elements throughout. Embodiments of the invention are generally directed to using an electronic alarm management program to notify a user of an upcoming event.

FIG. 1 illustrates a system 100 for using an electronic alarm management program to notify a user of an upcoming event, in accordance with an embodiment of the present invention. In an example embodiment, the system 100 may include a user device 102 and a server 104, all connected via one or more networks 106.

In the example embodiment, the network 106 is the Internet, representing a world-wide collection of networks and gateways to support communications between devices connected to the Internet. The network 106 may include, for example, wired, wireless, or fiber optic connections. In alternative embodiments, the network 106 may be implemented as an intranet, a local area network (LAN), or a wide area network (WAN). In general, the network 106 can be any combination of connections and protocols that will support communications between the user devices 102 and the server 104. The network 106 may be an example of a communications network 1200 illustrated in FIG. 3.

The user device 102 may include a user interface 108. The user device 102 may be a desktop computer, a notebook, a laptop computer, a tablet computer, a handheld device, a smart-phone, a cellular phone, a thin client, a peripheral device such as a smartwatch or other wearable device, or any other programmable electronic device, computing system, wired or wireless device supporting the functionality required by one or more embodiments of the invention. The user device 102 may be an instance of the computer 1010 shown in FIG. 3. Although FIG. 1 illustrates one user device 102, it should be appreciated that principles of an embodiment of the present invention are not restricted to one user device 102 and may be used with any number of user devices.

The user interface 108 may include components used to receive input from a user on the user device 102 and transmit the input to another user device and display the information to the user on the user device 102. For example, the user interface 108 may display a calendar notification for a scheduled event. Further, the user interface 108 may also display different prompts, such as, for example, a prompt to add an event into the calendar, a prompt to call individual at a certain time of day, or a prompt to change user device settings. The user device settings may include voice settings, display settings, application settings, calendar settings, camera settings, or any other settings that may be adjustable on the user device 102.

The server 104 may include an electronic alarm management program 110. In the example embodiment, the server 104 may be a desktop computer, a notebook, a laptop computer, a tablet computer, a thin client, or any other electronic device or computing system capable of storing, compiling, and organizing audio, visual, or textual content, and receiving and sending that content to and from other computing devices, such as the user devices 102. The server 104 may also be a remote server. For example, the server 104 may bet at a Cloud location remote from the user device 102, such as an electronic alarm management server.

The electronic alarm management program 110 may include a database 112. The electronic alarm management program 110 may detect trigger events, such as, for example, the user's interaction with the user device 102. For example, the electronic alarm management program 110 may detect the user initiating a shutdown action by clicking the shutdown button on the user device 102. The electronic alarm management program 110 may detect the battery state of the user device 102. For example, the electronic alarm management program 110 may detect that the battery of the user device 102 has 2% charge left. The electronic alarm management program 110 may also detect the trigger event of the user device 102 attempting to perform a software update.

In addition to detecting the user's interaction with the user device 102, the electronic alarm management program 110 may scan and parse different applications or programs on the user device 102 to determine, using natural language processing, if there are any upcoming events for that particular user. The different software applications or programs may include, but are not limited to, email, calendar, instant messaging, alarm file, call history log, text message history log, or any other applications or programs that the user may use to schedule events using the user device 102.

Although FIG. 1 illustrates the electronic alarm management program 110 included in a server 104 remote from the user device 102, it should be appreciated that the electronic alarm management program 110 may be included in the user device 102 in the form of an application. The electronic alarm management program 110 may be an example of a programs 1060 illustrated in FIG. 3.

The database 112 may store upcoming events scheduled for the user, an importance score associated with each event, and a threshold value. The database 112 may also store reminder or alarm notifications for the scheduled events. Some examples of events may include, but are not limited to, appointments, conference calls, scheduled meetings, or personal alarm notifications. Each of these events may have its own importance score. However, not every event may have an importance score associated with it.

In an embodiment of the present invention, the importance score may be a numerical value, ranging from 0 to 10, from least important set at 0 and most important set at 10. The importance score may be determined by the user for each event. For example, the user is scheduled to have a conference call at 11 am, on May $28^{th}$. The conference call is very important for the user because it relates to the user's work. The user, when scheduling the event, may associate with the event the importance score. In this case, the user decides to give this event (the conference call) an importance score of 10. In another example, the user is scheduled for a gym session at 7 pm, on May $29^{th}$. The gym session is not very important and so the user decides to give this event an importance score of 4.

In an alternative embodiment of the present invention, the importance score may be set by the electronic alarm management program 110. The electronic alarm management program 110 may utilize machine learning to assess the information stored in the database 112 and predict the importance scores for events scheduled by the user. For example, the user scheduled a first work conference call for a particular day and assigned it the importance score of 10. The user then scheduled a second work conference call but did not assign an importance score to it. The electronic alarm management program 110 may assign the second conference call the importance score of 10 based on the fact that the user assigned an importance score of 10 to the first work conference call. The user may either keep the importance score assigned by the electronic alarm management program 110 or set up a new importance score.

The database 112 may also store a threshold value. In an embodiment of the invention, the threshold value may be a numerical value, ranging between 0 and 10. The threshold value may be configurable at any time, or predefined by the user or the electronic alarm management program 110. The threshold value may be used to compare it to the importance score, associated with an event, to determine whether the importance score meets or exceeds the threshold value. If the importance score meets or exceeds the threshold value, then the electronic alarm management program 110 may deem the event, associated with that importance score, to be a critical event. If the importance score does not meet or exceed the threshold value, the electronic alarm management program 110 may deem the event to not be a critical event. For example, the user sets the threshold value at 5. A scheduled conference call with an importance value of 10 may be deemed a critical event because its importance score exceeds the threshold value. However, a gym session with an importance score of 4 does not meet or exceed the threshold value of 5 and is not deemed a critical event.

Figure 2:
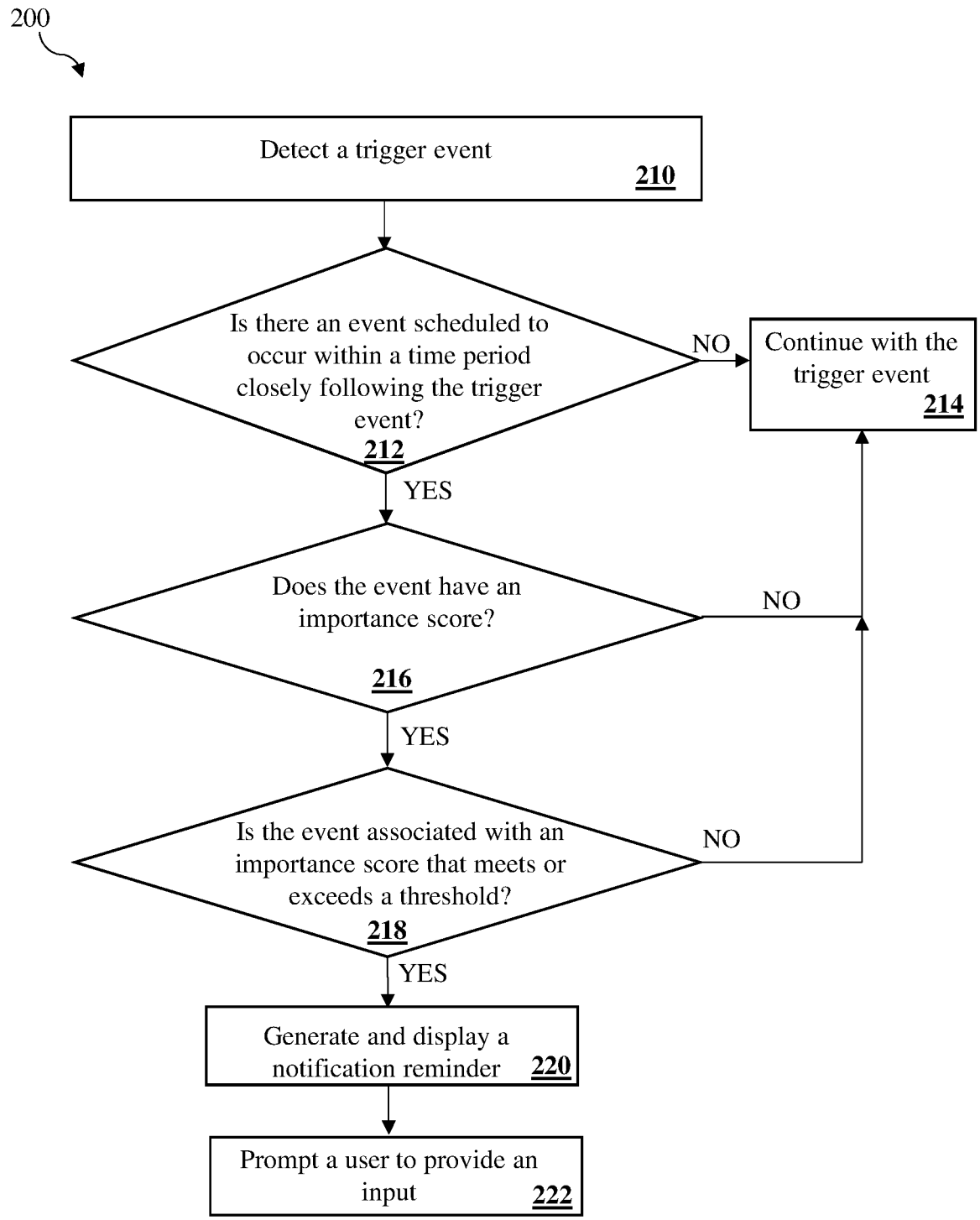
FIG. 2 is a flow chart illustrating an example method for using an electronic alarm management program to notify a user of an upcoming event, in accordance with an embodiment of the invention.

Referring to FIG. 2, a method 200 for using an electronic alarm management program 110 to notify a user of an upcoming event is depicted, in accordance with an embodiment of the present invention.

Referring to operation 210, the electronic alarm management program 110 detects a trigger event. As described herein with reference to FIG. 1, the trigger event may be, but is not limited to, the user powering off the user device 102, the user device 102 having a low battery charge, or the user device 102 attempting to perform a software update. For example, the user decides to power off the user device 102. The user presses the power off button of the user device 102. The electronic alarm management program 110 detects that the power off button is pressed and identifies it as the trigger event of the user attempting to turn of the user device 102.

Referring to operation 212, the electronic alarm management program 110 scans and parses the different applications or programs, on the user device 102, to determine, using natural language processing, if there are any upcoming events for the user that are scheduled to occur within a time period closely following the trigger event. The time period closely following the trigger event may be counted by minutes or even hours. For example, the time period closely following the trigger event may be 10 minutes or one hour.

Continuing with the example described herein with reference to operation 210, once the electronic alarm management program 110 detects the user's attempt to turn off the user device 102, the electronic alarm management program 110 scans and parses, for example, the user's calendar to determine whether the user has an event scheduled to occur within a time period closely following the user device 102 shutdown. In this example, the time period closely following the user device 102 shutdown may be 5 minutes. In another example, if a calendar is broken up into 30 minute blocks, then 25 minutes before an event is scheduled to occur may be considered the time period closely following the scheduled even. However, 35 minutes before an event is scheduled to occur may no longer be considered the time period closely following the event. As such, the time closely following the trigger event may be associated with the time slots on the calendar. Further, the trigger event itself may dictate the time closely following the trigger event. For example, the calendar is broken up into 15 minute blocks. If the trigger event takes two time blocks on the calendar, then the time closely following the time of the trigger event is two calendar time blocks.

During the scanning and parsing process, the electronic alarm management program 110 may go through calendar entries or contextually identified important dates and times taken from, for example, the user's email or instant messaging applications. The electronic alarm management program 110 may also scan the alarms set on the user device 102, as well as the call or text history of the user.

The electronic alarm management program 110 may also determine the time period closely following the trigger event. The time period may range from minutes to hours and may depend on the trigger event. For example, if the trigger event is a user device 102 software update that can last up to a few hours, the electronic alarm management program 110 may determine that an hour is an appropriate time period. However, if the trigger event is the user device 102 having a low battery charge, the electronic alarm management program 110 may determine that the appropriate time period is 4 hours. If, within the determined time period, such as, for example, four hours, the electronic alarm management program 110 determines that an event is scheduled, the electronic alarm management program 110 proceeds to operation 216.

Referring to operation 214, if the electronic alarm management program 110 does not identify an event is scheduled to occur within the determined time period closely following the trigger event, the electronic alarm management program 110 allows the trigger event to continue. For example, if the user is attempting to power off the user device 102, and the electronic alarm management program 110 does not identify any events scheduled for the user within 4 hours, the user is allowed to power off the user device 102 without any interruption from the electronic alarm management program 110.

Referring to operation 216, once the electronic alarm management program 110 identifies an event is scheduled within a time period closely following the trigger event, the electronic alarm management program 110 determines an importance score associated with it. For example, the user may have a phone conference with an employee scheduled within an hour of the user attempting to shut off the user device 102. The electronic alarm management program 110 identifies the scheduled telephone conference and determines that the phone conference has an importance score of 10. In this example, the importance score is predetermined and may have been set by the user. In alternative embodiments, the electronic alarm management program 110 may use machine learning to automatically set the importance score based on importance scores of other similar events that the user had scheduled.

Referring to operation 218, the electronic alarm management program 110 compares the importance score of the scheduled event with a predetermined threshold value to determine whether the importance score meets or exceeds the threshold. For example, if the predetermined threshold value is 5 and the importance value of the telephone conversation is determined to be 10, then the electronic alarm management program 110 identifies the telephone conversation as important.

Referring to operation 220, when the importance score of the scheduled event meets or exceeds the threshold, the electronic alarm management program 110 prevents the trigger event from happening and then generates a notification and displays that notification on the user device 102. The notification may have information pertaining to the event that is scheduled to occur within a short time period. For example, the user device 102 is attempting to perform a scheduled software update. The electronic alarm management program 110 scans the user's calendar and determines that the user has a conference call scheduled within the next hour and a reminder set within 30 minutes. The conference call has in importance value set at 10, which exceeds the threshold of 5. The electronic alarm management program 110 deems the event to be an important event and displays the conference call details on the user interface 108 of the user device 102, thus providing the user with a reminder of the upcoming conference call. In an embodiment, rather than notifying the user, the electronic alarm management program 110 can automatically reschedule the software update to a time that does not conflict with any scheduled events, or at least the one event scheduled closely following the trigger event. Automatically rescheduling the software update prevents the user from missing the alarm associated with the scheduled event.

Referring to operation 222, the electronic alarm management program 110 prompts the user to provide an input. The input may be a first input causing the user device 102 to remain in an on state until the time of the critical event passes. The input may also be a second input causing the user device 102 to continue with the trigger event. The electronic alarm management program 110 may use machine learning and other adaptive learning processes to learn the different user input patterns. For example, the different user input patterns may be used to determine an importance score for a scheduled event or to adjust an existing importance score for a particular scheduled event. For example, the user may have a notification scheduled for a recurring meeting. If the meeting has an importance score that exceeds the threshold value of 5, the electronic alarm management program 110 may adjust the importance score to a lower value, for example to an importance score of 4, if the user always provides a second input, causing the user device 102 to shut down.

Referring back to operation 216, the electronic alarm management program 110 may determine that the event does not have an importance score associated with it. As a result, the electronic alarm management program 110 may execute operation 214 and allow the trigger event to continue.

In an alternative embodiment of the present invention, even though the electronic alarm management program 110 determines that the event does not have an importance score, the electronic alarm management program 110 may nonetheless proceed with operation 220 and generate and display a notification reminder associated with the scheduled event. For example, the user has a scheduled doctor appointment set for 4 pm on a Tuesday. The user also has a reminder alarm set up for 3 pm on that Tuesday but does not have an importance score associated with the doctor appointment. About 10 minutes before the reminder alarm is to go off, the user decides to power off the user device 102. The electronic alarm management program 110 scans and parses the calendar and determines that there is a doctor appointment scheduled and a reminder alarm set to go off within 10 minutes of the trigger event however, there is no importance score associated with the scheduled event. Instead of allowing the user to power off the user device 102 (operation 214), the electronic alarm management program 110 generates and displays a notification, at operation 220, for the user to inform the user of the upcoming reminder alarm and the scheduled event.

In another example, the user may have a notification scheduled for a recurring meeting. Even though the recurring meeting does not have an importance score, the electronic alarm management program 110 generates and displays the notification reminder every time there is a trigger event occurring at a time period closely preceding the scheduled notification and the scheduled meeting. The user always provides the electronic alarm management program 110 the first input causing the user device 102 to remain in an on state. Utilizing machine learning and other adaptive learning processes, the electronic alarm management program 110 may determine an importance score for that recurring meeting. Because the user always allows for the user device 102 to remain in an on state, the importance score may be above the threshold value of 5. The user may then keep the importance score determined by the electronic alarm management program 110, discard the importance score, or adjust the importance score.

In yet another alternative embodiment of the present invention, referring back to operation 212, even though there is no event scheduled to occur within a time period closely following the trigger event, the electronic alarm management program 110 may nonetheless generate and display a notification reminder (operation 220). For example, the user is an elderly person who usually receives a phone call from a family member at the same time every day. The user does not have the event scheduled in the calendar. In addition, the user forgets that the user should be receiving a phone call and decides to power off the user device 102 about 30 minutes before the user should be receiving the phone call. When the electronic alarm management program 110 detects that the user pushed the power off button on the user device 102, the electronic alarm management program 110 scans the phone history of the user and determines that the user should be receiving a phone call shortly. Instead of allowing the user to power off the user device 102, the electronic alarm management program 110 generates and displays a notification for the user to inform the user of the upcoming phone call from a family member. As a result, the user is aware of the upcoming phone call and can then decide whether to continue with the trigger event, or wait until the upcoming phone call is complete before powering off the user device 102.

Figure 3:
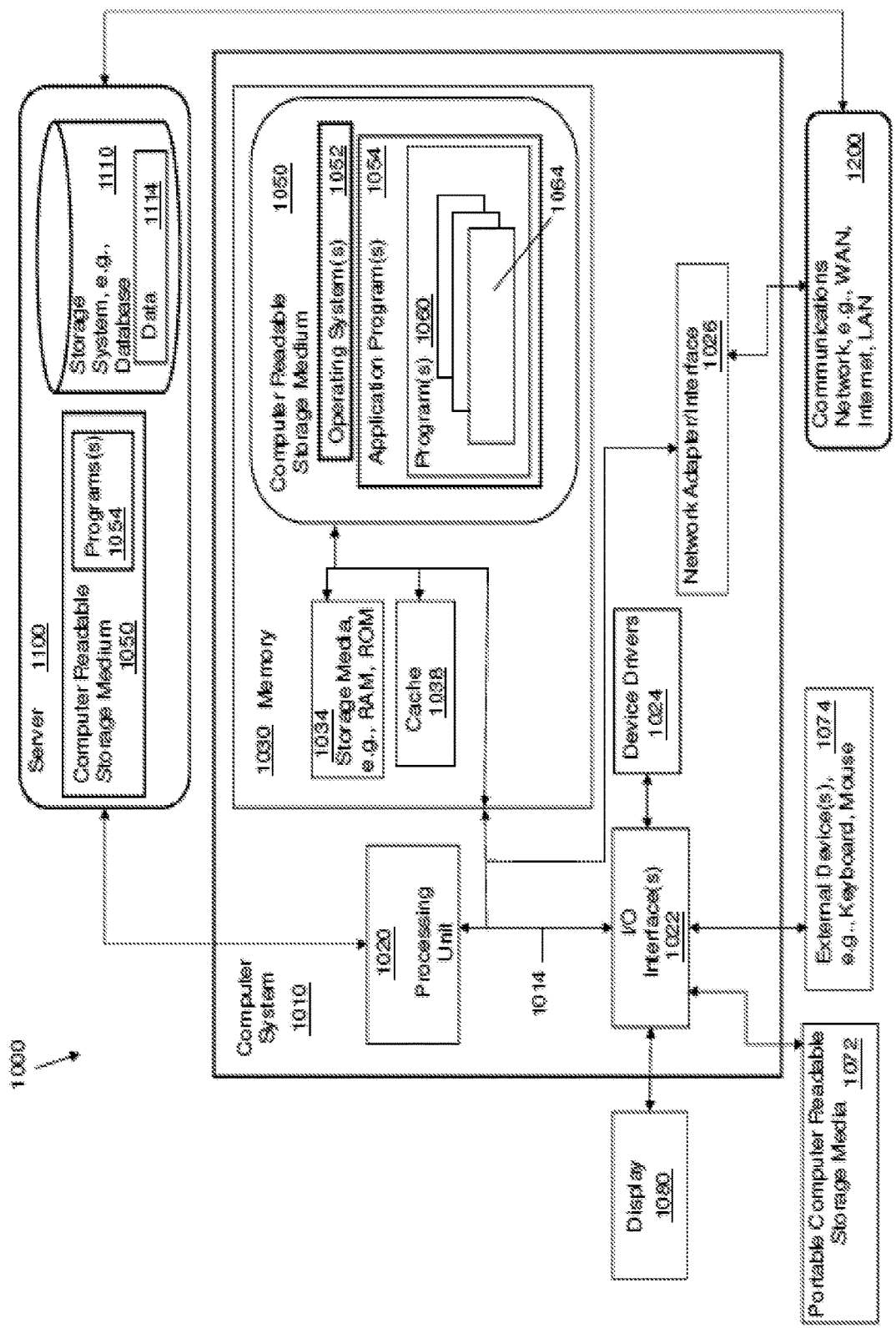
FIG. 3 is a block diagram depicting the hardware components of a system for using an electronic alarm management program to notify a user of an upcoming event, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/ output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
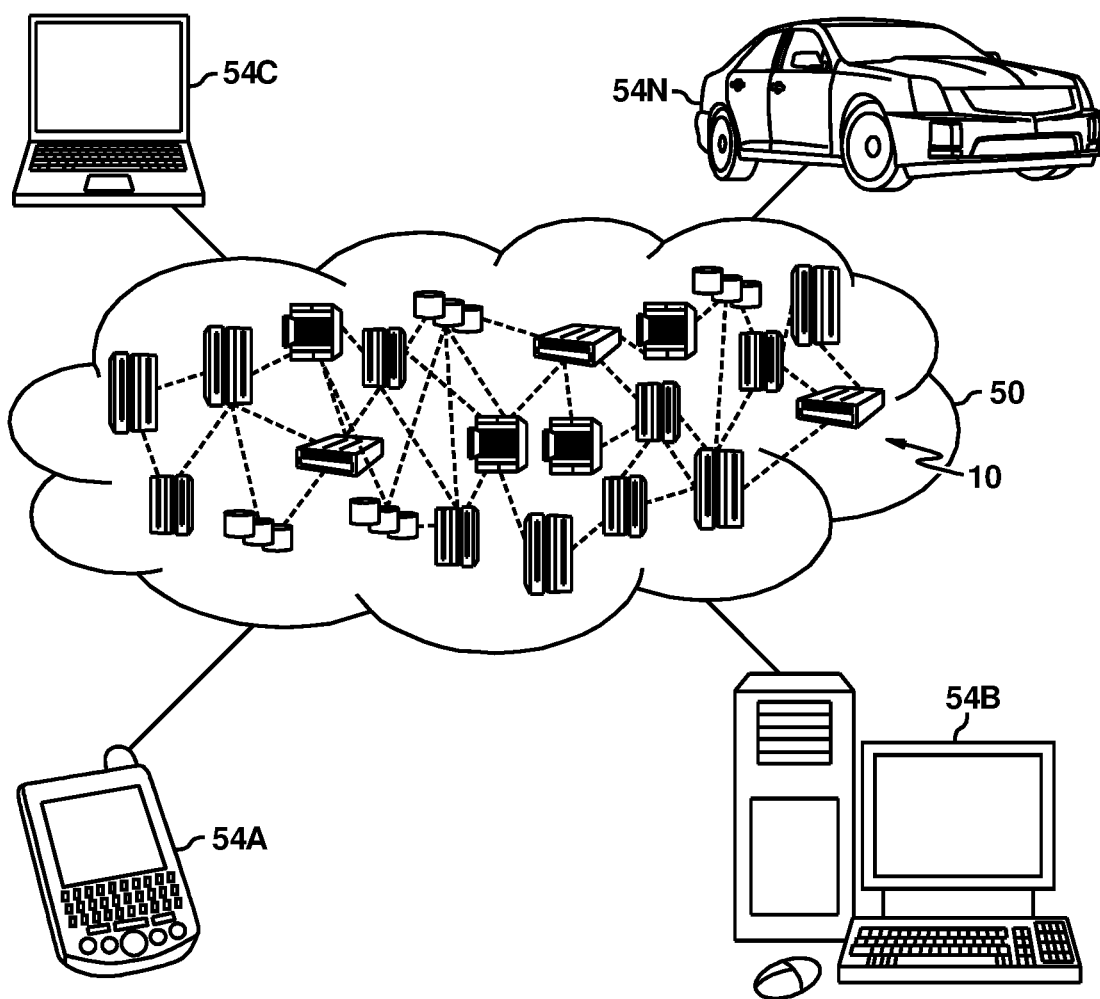
FIG. 4 is a functional block diagram depicting a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
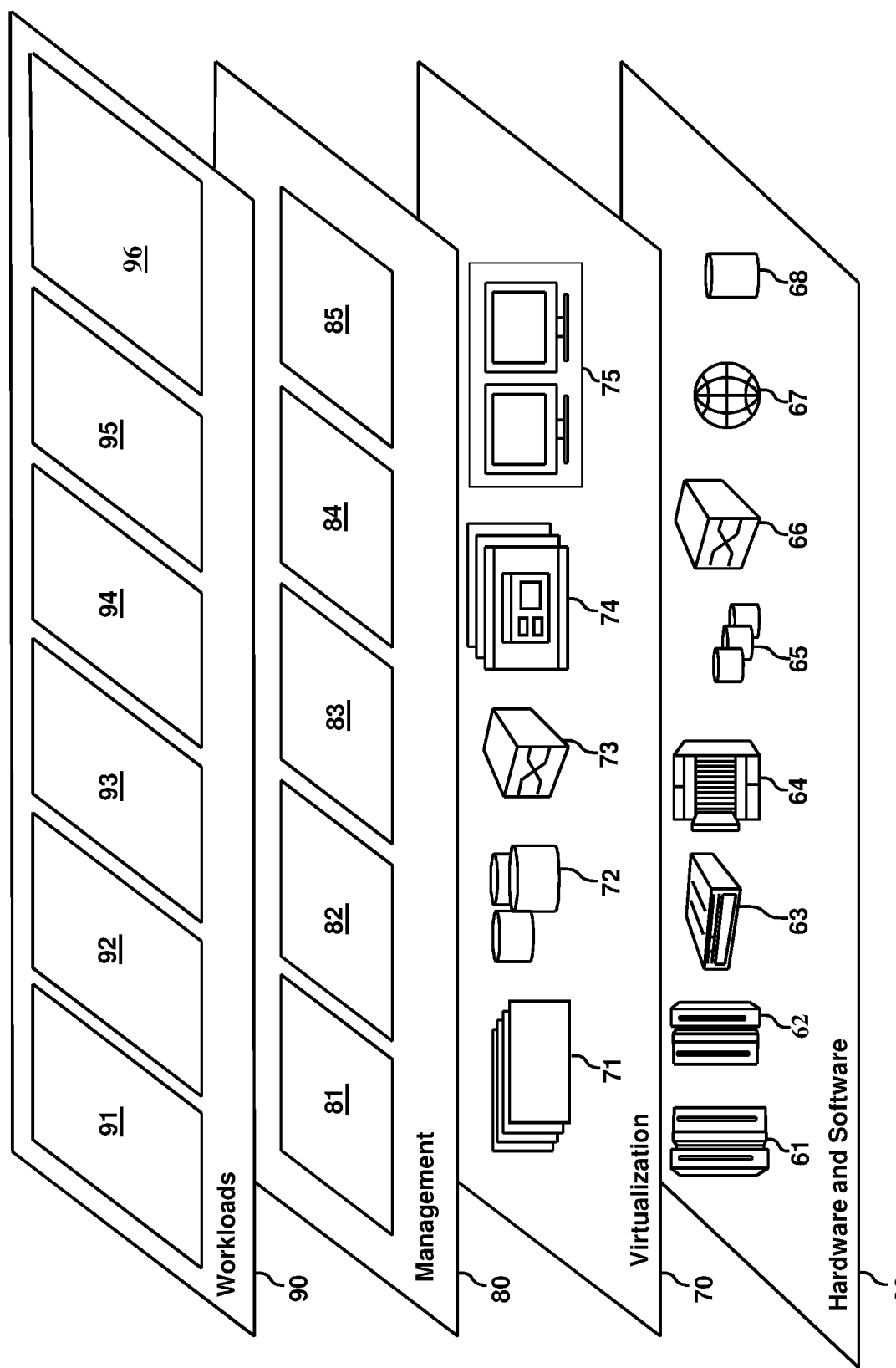
FIG. 5 is a diagram depicting abstraction model layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notifying a user of an upcoming event 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of notifying a user of upcoming events, the method comprising:

detecting, by a natural language processing of an electronic alarm management program, a trigger event that causes a user device to be shut down, wherein the detecting include scanning and parsing a plurality of applications on the user device for the trigger event;

determining, by the electronic alarm management program, whether there is an event for the user of the user device that is scheduled to occur within a first time period closely following a time of the trigger event;

in response to determining that there is an event occurring within the time period closely following the time of the trigger event, determining, by the electronic alarm management program, whether the event is associated with an importance score that exceeds a threshold, wherein the importance score is a numerical value based on a level of importance the user determines for the event, wherein the electronic alarm management program uses machine learning to automatically set the importance score based on importance scores of other similar events that the user had scheduled, and wherein the event having the importance score exceeding the threshold is deemed a critical event; and generating and displaying, by the electronic alarm management program, a notification on the user device, the notification reminding the user of the critical event.

2. The method of claim 1, further comprising:

prompting, by the electronic alarm management program, the user to provide a first input causing the user device to remain in an on state until a time of the critical event.

3. The method of claim 1, wherein the trigger event is one of a user initiating a shutdown action on the user device, the user device having a low battery, or the user device is attempting to perform a software update.

4. The method of claim 1, wherein the determining whether there is an event for the user that is scheduled to occur within the first time period includes:

scanning and parsing, by the electronic alarm management program a calendar of the user, an alarm file of a software application running on the user device, a calling history, or a messaging history of the user.

5. The method of claim 2, further comprising:

determining, by the electronic alarm management program, whether the first input is received from the user; and storing, by the electronic alarm management program, a result of the determination for use in determining the importance score.

6. The method of claim 3, wherein the user device is attempting to perform the software update, further comprising:

changing, by the electronic alarm management program, a scheduled software update time to avoid the user missing the alarm.

7. A computer system for notifying a user of upcoming events, the computer system, comprising:

one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

detecting, by a natural language processing of an electronic alarm management program, a trigger event that causes a user device to be shut down, wherein the detecting include scanning and parsing a plurality of applications on the user device for the trigger event;

determining, by the electronic alarm management program, whether there is an event for the user of the user device that is scheduled to occur within a first time period closely following a time of the trigger event;

in response to determining that there is an event occurring within the time period closely following the time of the trigger event, determining, by the electronic alarm management program, whether the event is associated with an importance score that exceeds a threshold, wherein the importance score is a numerical value based on a level of importance the user determines for the event, wherein the electronic alarm management program uses machine learning to automatically set the importance score based on importance scores of other similar events that the user had scheduled, and wherein the event having the importance score exceeding the threshold is deemed a critical event; and generating and displaying, by the electronic alarm management program, a notification on the user device, the notification reminding the user of the critical event.

8. The computer system of claim 7, further comprising:
prompting, by the electronic alarm management program, the user to provide a first input causing the user device to remain in an on state until a time of the critical event.

9. The computer system of claim 7, wherein the trigger event is one of a user initiating a shutdown action on the user device, the user device having a low battery, or the user device is attempting to perform a software update.

10. The computer system of claim 7, wherein the determining whether there is an event for the user that is scheduled to occur within the first time period includes:
scanning and parsing, by the electronic alarm management program, a calendar of the user, an alarm file of a software application running on the user device, a calling history, or a messaging history of the user.

11. The computer system of claim 8, further comprising:
determining, by the electronic alarm management program, whether the first input is received from the user; and
storing, by the electronic alarm management program, a result of the determination for use in determining the importance score.

12. The computer system of claim 9, wherein the user device is attempting to perform the software update, further comprising:
changing, by the electronic alarm management program, a scheduled software update time to avoid the user missing the alarm.

13. A computer program product for notifying a user of upcoming events, the computer program product, comprising:
one or more computer-readable tangible storage media and program instructions stored on at least one of the one or more computer-readable tangible storage media, the program instructions executable by a processor to cause the processor to perform a method comprising:
detecting, by a natural language processing of an electronic alarm management program a trigger event that causes a user device to be shut down, wherein the detecting include scanning and parsing a plurality of applications on the user device for the trigger event;
determining whether there is an event for the user of the user device that is scheduled to occur within a first time period closely following a time of the trigger event;
in response to determining that there is an event occurring within the time period closely following the time of the trigger event, determining whether the event is associated with an importance score that exceeds a threshold, wherein the importance score is a numerical value based on a level of importance the user determines for the event, wherein the electronic alarm management program uses machine learning to automatically set the importance score based on importance scores of other similar events that the user had scheduled, and wherein the event having the importance score exceeding the threshold is deemed a critical event; and
generating and displaying a notification on the user device, the notification reminding the user of the critical event.

14. The computer program product of claim 13, further comprising:
prompting the user to provide a first input causing the user device to remain in an on state until a time of the critical event.

15. The computer program product of claim 13, wherein the trigger event is one of a user initiating a shutdown action on the user device, the user device having a low battery, or the user device is attempting to perform a software update.

16. The computer program product of claim 13, wherein the determining whether there is an event for the user that is scheduled to occur within the first time period includes:
scanning and parsing a calendar of the user, an alarm file of a software application running on the user device, a calling history, or a messaging history of the user.

17. The computer program product of claim 14, further comprising:
determining whether the first input is received from the user; and
storing a result of the determination for use in determining the importance score.

18. The computer program product of claim 15, wherein the user device is attempting to perform the software update, further comprising:
changing a scheduled software update time to avoid the user missing the alarm.

* * * * *